US010688435B2

(12) United States Patent
Henson et al.

(10) Patent No.: US 10,688,435 B2
(45) Date of Patent: Jun. 23, 2020

(54) DUAL STRIPPER WITH WATER SWEEP GAS

(71) Applicant: HONEYWELL INTERNATIONAL INC., Morris Plains, NJ (US)

(72) Inventors: Phoebe Henson, Scottsdale, AZ (US); Stephen Yates, South Barrington, IL (US); Jun Isobe, Torrance, CA (US); Rebecca Kamire, Vernon Hills, IL (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 222 days.

(21) Appl. No.: 15/896,156

(22) Filed: Feb. 14, 2018

(65) Prior Publication Data

US 2018/0243685 A1 Aug. 30, 2018

Related U.S. Application Data

(60) Provisional application No. 62/463,921, filed on Feb. 27, 2017.

(51) Int. Cl.
*B01D 53/22* (2006.01)
*B01D 53/78* (2006.01)
(Continued)

(52) U.S. Cl.
CPC ....... *B01D 53/229* (2013.01); *B01D 53/1425* (2013.01); *B01D 53/1475* (2013.01);
(Continued)

(58) Field of Classification Search
CPC ............ B01D 53/1425; B01D 53/1475; B01D 53/22; B01D 53/229; B01D 2053/224;
(Continued)

(56) References Cited

U.S. PATENT DOCUMENTS 4,997,630 A * 3/1991 Wagner .............. B01D 53/1468
423/228
5,254,143 A 10/1993 Anazawa et al.
(Continued)

FOREIGN PATENT DOCUMENTS

| EP | 0374873 A2 | 6/1990 |
|---|---|---|
| WO | WO8602628 A1 | 5/1986 |
| WO | WO2012123571 A1 | 9/2012 |

OTHER PUBLICATIONS

Wang et al., "Modeling of CO2 Stripping in a Hollow Fiber Membrane Contactor for CO2 Capture", American Chemical Society Publications, Energy & Fuels, Oct. 1, 2013, 6887-6898.
(Continued)

*Primary Examiner* — Jason M Greene
(74) *Attorney, Agent, or Firm* — Lorenz & Kopf, LLP

(57) ABSTRACT

An environmental control system includes an air conditioning subsystem and a contaminant removal subsystem downstream of the environment to be conditioned. The contaminant removal subsystem includes a first gas-liquid contactor-separator, a second gas-liquid contactor-separator, and a third gas-liquid contactor-separator. One of the first, the second, and the third gas-liquid contactor-separators is configured to receive used absorbent liquid having at least a first contaminant and discharge at least a first contaminant for recovery and reuse. Another of the first, the second and the third gas-liquid contactor-separators is configured to receive used absorbent liquid having at least a second contaminant and discharge at least the second contaminant for recovery and reuse.

17 Claims, 9 Drawing Sheets

(51) Int. Cl.
  *B01D 53/62* (2006.01)
  *B01D 53/14* (2006.01)
(52) U.S. Cl.
  CPC .............. *B01D 53/22* (2013.01); *B01D 53/62* (2013.01); *B01D 53/78* (2013.01); *B01D 2053/224* (2013.01); *B01D 2252/30* (2013.01); *B01D 2256/22* (2013.01); *B01D 2257/504* (2013.01); *B01D 2257/708* (2013.01); *B01D 2257/80* (2013.01); *B01D 2259/4575* (2013.01)
(58) Field of Classification Search
  CPC .............. B01D 63/02; B01D 2257/504; B01D 2257/80; B01D 2259/4575
  See application file for complete search history.

(56) References Cited

U.S. PATENT DOCUMENTS

| | | | |
|---|---|---|---|
| 5,281,254 | A | 1/1994 | Birbara et al. |
| 6,165,253 | A | 12/2000 | Sirkar et al. |
| 6,228,145 | B1 | 5/2001 | Falk-Pedersen et al. |
| 6,616,841 | B2 | 9/2003 | Cho et al. |
| 7,687,048 | B1* | 3/2010 | Schultz .............. B01D 53/1425 423/220 |
| 8,317,906 | B2 | 11/2012 | Bansal |
| 8,518,156 | B2 | 8/2013 | Kozak et al. |
| 9,155,991 | B2 | 10/2015 | Ogawa |
| 9,289,717 | B2 | 3/2016 | Peake et al. |
| 9,333,458 | B2 | 5/2016 | Cao |
| 9,623,369 | B2 | 4/2017 | Bikson et al. |
| 2004/0265199 | A1* | 12/2004 | MacKnight ........ B01D 53/1475 423/220 |
| 2006/0266214 | A1* | 11/2006 | Won ................... B01D 53/1425 95/234 |
| 2008/0127831 | A1* | 6/2008 | Rochelle ............ B01D 53/1425 96/181 |
| 2008/0276803 | A1 | 11/2008 | Molaison |
| 2010/0132563 | A1* | 6/2010 | Pan .................... B01D 53/1425 96/181 |
| 2010/0313758 | A1 | 12/2010 | Stevens |
| 2012/0247327 | A1* | 10/2012 | Omole ............... B01D 53/1425 95/51 |
| 2013/0327990 | A1* | 12/2013 | Mak ................... B01D 53/1406 252/373 |
| 2014/0322118 | A1* | 10/2014 | Vera-Castaneda .......................... B01D 53/1425 423/243.11 |
| 2015/0273386 | A1 | 10/2015 | Thyssenkrupp |
| 2017/0165603 | A1* | 6/2017 | Fujita ................ B01D 53/1475 |

OTHER PUBLICATIONS

Gomez-Coma et al., "Mass Transfer Analysis of CO2 Capture by PVDF Membrane Contactor and Ionic Liquid", Chemical Engineering & Technology, 2017, 40, No. 4, 1-14.

Dai et al., "Precombustion CO2 Capture in Polymeric Hollow Fiber Membrane Contactors Using Ionic Liquids: Porous Membrane versus Nonporous Composite Membrane", American Chmical Society Puclications, Industrial & Engineering Chemistry Research, May 2, 2016, 5983-5992.

International search report and opinion, dated Aug. 30, 2018, application No. PCT/US2018/022382.

* cited by examiner

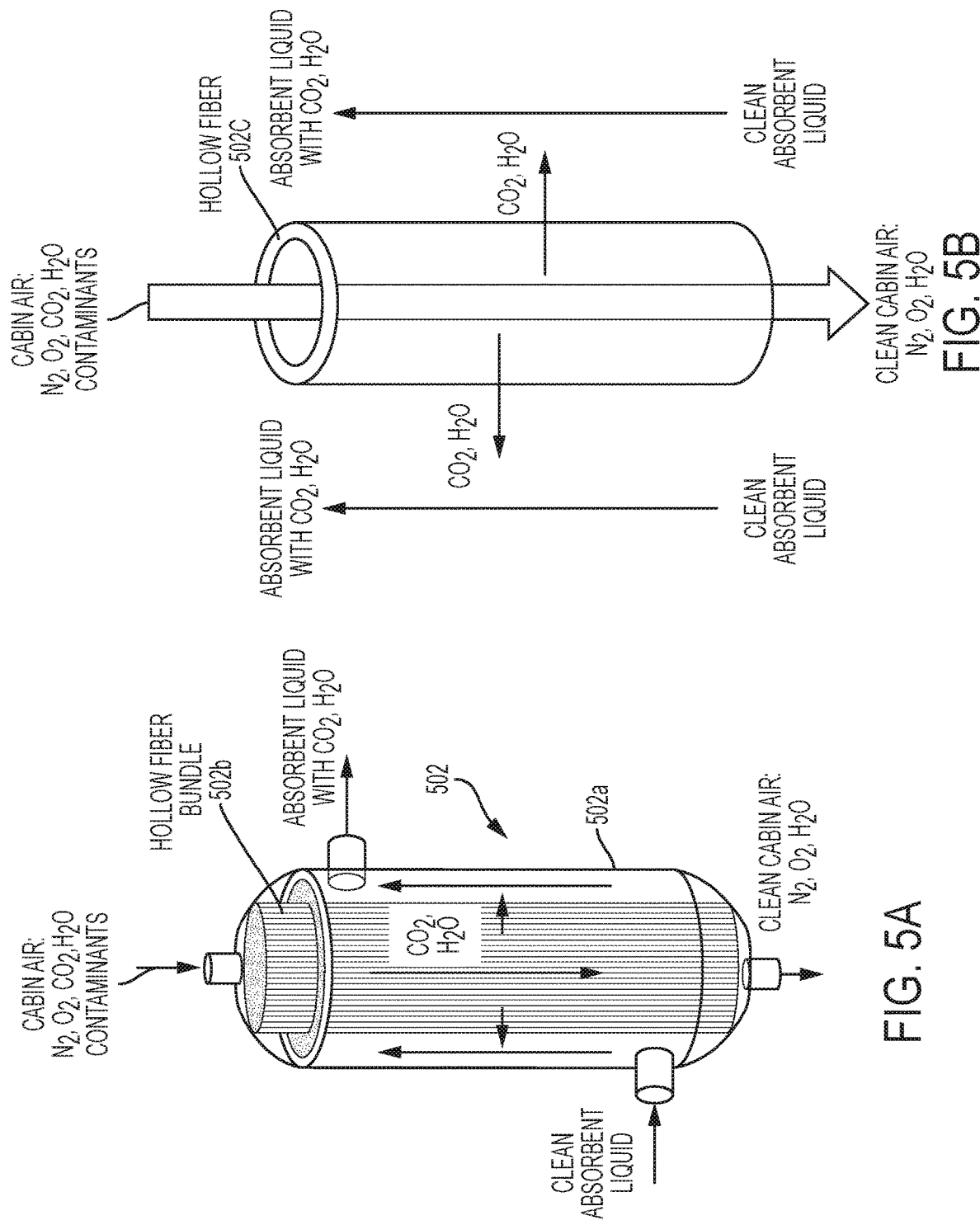

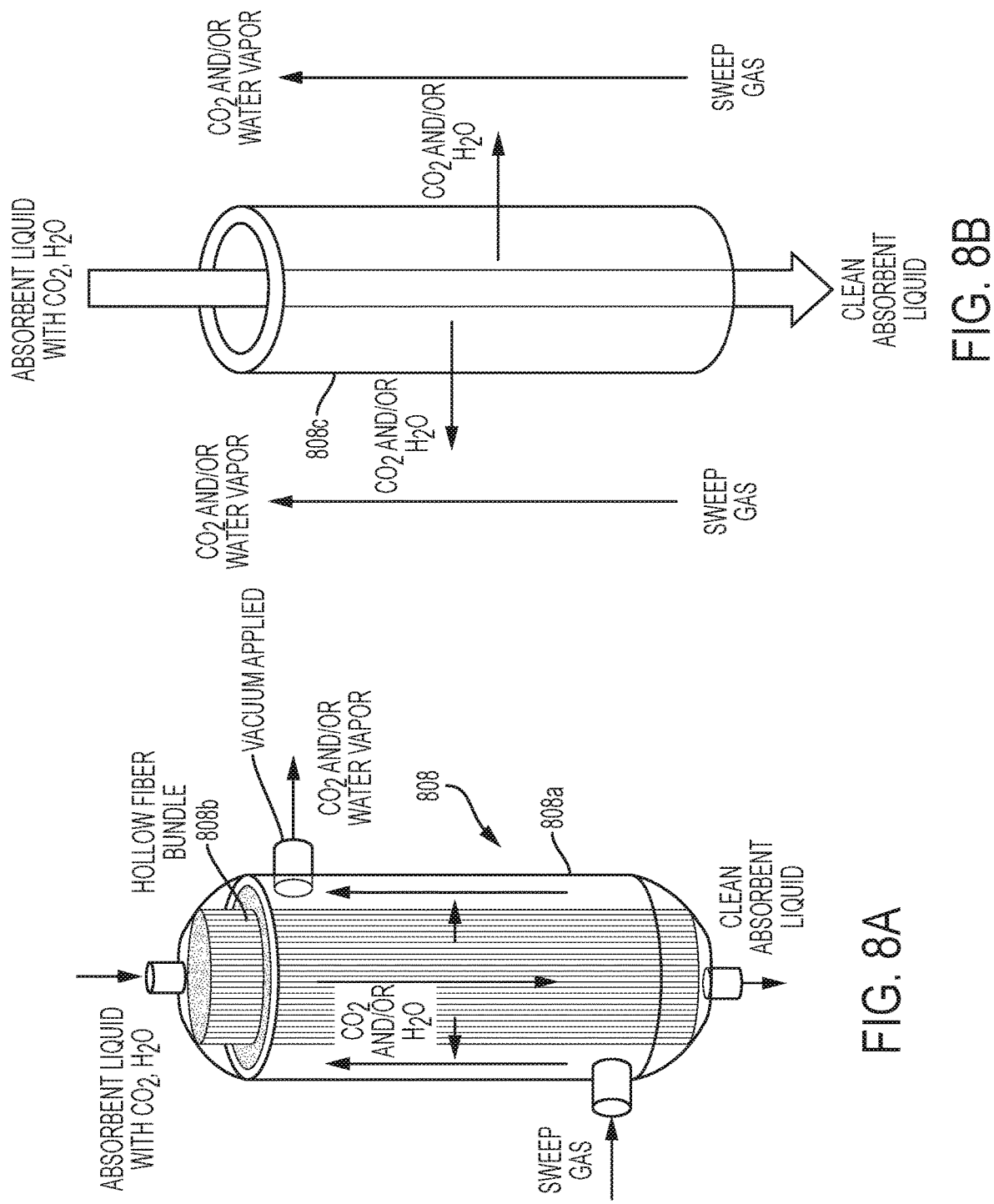

DUAL STRIPPER WITH WATER SWEEP GAS

CROSS-REFERENCE TO RELATED APPLICATIONS

This application claims the benefit of U.S. provisional application No. 62/463,921, filed Feb. 27, 2017.

BACKGROUND OF THE INVENTION

The present invention generally relates to contaminant removal and, more particularly, to apparatus and methods of contaminant removal employing gas-liquid contact and separation.

It is of great interest to control and limit the concentration of carbon dioxide ($CO_2$) in occupied spaces, including homes, buildings, transportation vehicles, aircraft and spacecraft. It is particularly important to control $CO_2$ concentrations in enclosed vehicles like aircraft or spacecraft. In aircraft, fresh air enters the occupied space as bleed air from the engine, and results in increased fuel consumption. Decreasing the bleed air flow would improve fuel efficiency, but would require a technology to remove $CO_2$ from the air. The Federal Aviation Administration (FAA) of the United States limits the acceptable concentration of $CO_2$ to 5000 ppm, while aircraft typically have 1500-2300 ppm. In spacecraft, no fresh air is available, and the cabin air must be preserved in a healthful condition.

Crews of the International Space Station (ISS), with elevated $CO_2$ levels just under 4 torr (5300 ppm), have reported symptoms such as early fatigue onset, impaired function and decision-making, and headaches. Law J, Alexander D (2016). $CO_2$ on the International Space Station: An Operations Update. Annual AsMA Meeting; 24-28 Apr. 2016; Atlantic City, N.J., USA; https://ntrs.nasa.gov/archive/nasa/casi.ntrs.nasa.gov/20150019624.pdf. Long duration, deep space missions lengthen crew exposure to these conditions. NASA is requiring future spacecraft to maintain $CO_2$ partial pressures in the vessel atmosphere below 2 torr (2600 ppm) to preserve crew health, and maintain alertness and comfort. Therefore, more advanced $CO_2$ removal systems are required for next generation deep space vehicles in order to maintain a much lower $CO_2$ partial pressure. In addition, deep space vehicles are required to have a lower size, weight, power, and thermal load, and use fewer consumables, while fixing existing safety problems that are apparent in current systems. The maintenance interval of current systems (three to six months) is also required to jump to three years.

$CO_2$ recovery and recycling is a critical component of the air revitalization system for long duration missions. Presently on ISS, the carbon cycle, or carbon loop, is not closed and $CO_2$ is either discarded to space or processed through a Sabatier reactor to recover water; methane produced by the Sabatier reactor is discarded to space. Longer duration missions will require a more closed carbon loop to minimize carrying disposable resources in the vessel—such as water, hydrogen, oxygen, etc.—that might otherwise be replenished from recycling $CO_2$. In other words, any discarded carbon dioxide increases the amount of oxygen or water required to be brought with the mission.

For applications in spacecraft or aircraft, the size and weight of the overall system must be minimized. Great emphasis must be placed on minimizing the size, weight and number of scrubber or stripper modules. It is well known that stripper modules can be made to be more efficient if a sweep gas is used to flush the permeate out of the module, and that this can minimize the size, weight and number of such modules. But the source of this sweep gas is also important, since if it is foreign to the process then a supply of this gas must be provided.

Such a closed-loop $CO_2$ recovery system should be capable of throttling its process when process demand is lower in order to reduce energy consumption. For missions to Mars, some plans include landing on the planet and remaining there for eighteen months, during which the Mars Transfer Habitat remains in Mars orbit, unoccupied. The life support system would remain in an operationally ready state during this period able to resume operation with high reliability for the return flight quickly.

In the past, solid adsorbents have been used for $CO_2$ removal. However, liquid absorbents have significant advantages over solid adsorbents. The ability to pump the absorbent from scrubber to stripper stages allows for continuous absorption and regeneration of the sorbent, which is generally more stable and reliable than alternating adsorbent beds between absorption and regeneration, and eliminates the need for a complicated valve network. Liquid may also be easily replenished or exchanged without disassembly.

Existing state-of-the-art $CO_2$ removal systems include the Carbon Dioxide Removal Assembly (CDRA) aboard the ISS, which relies on solid zeolite adsorbents that experience a particulate dusting problem and is higher in size, weight and power when compared to estimates of a liquid system. Other $CO_2$ removal systems include amine-based systems like those used on submarines. These amines are prone to outgassing of dangerous and odorous products, air oxidation and thermal degradation, and can be corrosive.

The above facts suggest a great need for improved apparatus and methods to remove contaminants from supply air in environments such as deep space vehicles.

SUMMARY OF THE INVENTION

In one aspect of the present invention, an environmental control system comprises an air conditioning subsystem; a contaminant removal subsystem downstream of the environment to be conditioned; wherein the contaminant removal subsystem includes: a first gas-liquid contactor-separator; a second gas-liquid contactor-separator; a third gas-liquid contactor-separator; and wherein one of the first, the second, and the third gas-liquid contactor-separators is configured to: receive used absorbent liquid having at least a first contaminant; discharge at least the first contaminant for recovery and reuse; wherein another of the first, the second and the third gas-liquid contactor-separators is configured to: receive used absorbent liquid having at least a second contaminant; discharge at least the second contaminant for recovery and reuse.

In a further aspect of the present invention, a contaminant removal subsystem comprises a first gas-liquid contactor-separator; a second gas-liquid contactor-separator downstream of the first gas-liquid contactor-separator; a third gas-liquid contactor-separator downstream of the second gas-liquid contactor-separator; wherein the first gas-liquid contactor-separator is configured to: receive a clean absorbent liquid; discharge a used liquid absorbent; wherein the second gas-liquid contactor-separator is configured to: receive used absorbent liquid; discharge a first contaminant from used liquid absorbent for recovery and reuse; wherein the third gas-liquid contactor-separator is configured to: receive used absorbent liquid; and discharge a second contaminant from used liquid absorbent for recovery and reuse.

In another aspect of the present invention, a contaminant removal subsystem comprises a scrubber; a first stripper downstream of the scrubber; a second stripper downstream of the first stripper; and a water vaporizer downstream of the first stripper; wherein the first stripper is configured to discharge a first contaminant for recovery and reuse; wherein the second stripper is configured to discharge a second contaminant for recovery and reuse; and wherein the water vaporizer is configured to provide a sweep gas to the first stripper.

These and other features, aspects and advantages of the present invention will become better understood with reference to the following drawings, description and claims.

BRIEF DESCRIPTION OF THE DRAWINGS

FIGS. 5A-5B are side views of a scrubber according to an embodiment of the present invention;

FIGS. 8A-8B are side views of a stripper according to another embodiment of the present invention;

DETAILED DESCRIPTION OF THE INVENTION

Figure 1:
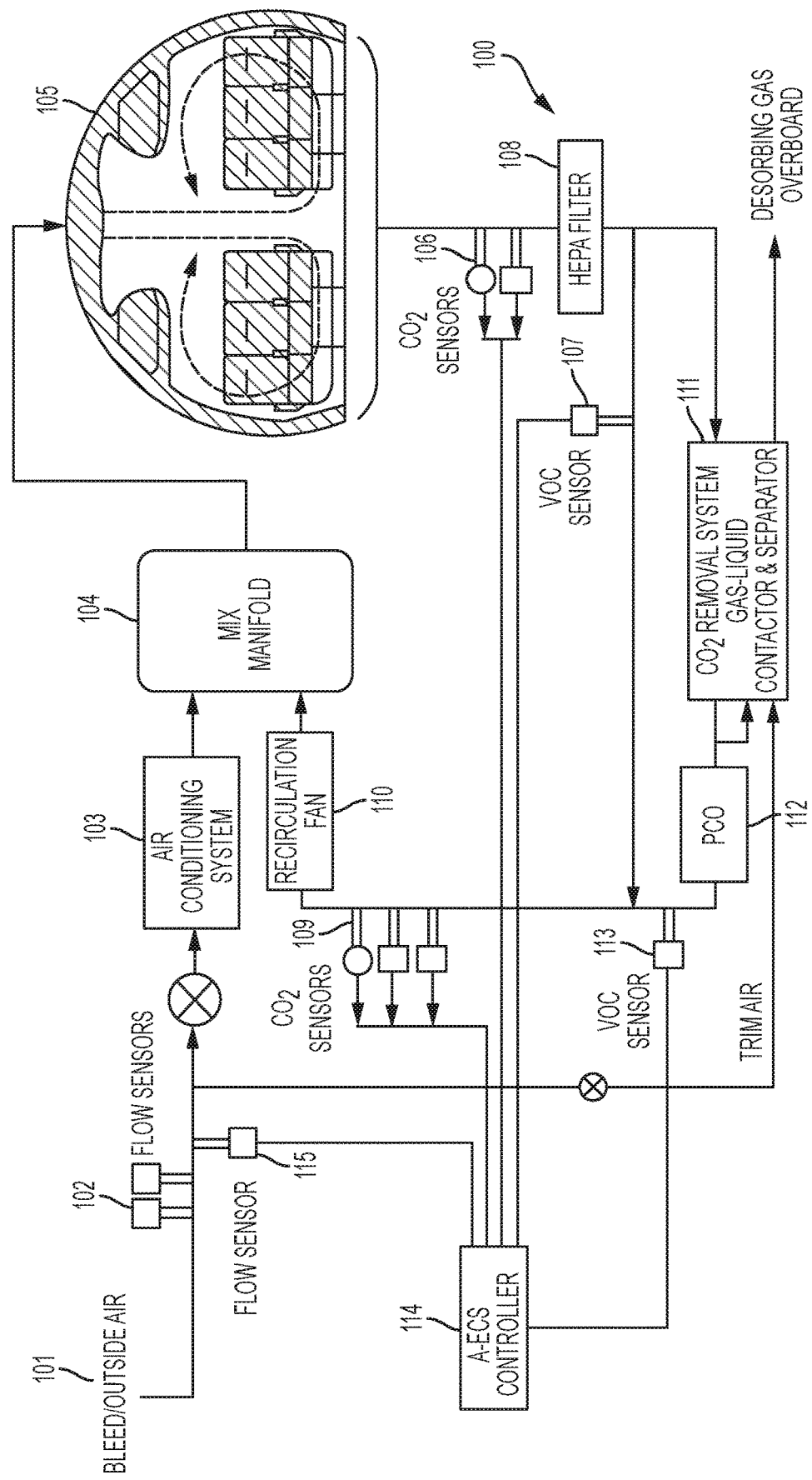
FIG. 1 is a schematic diagram of an environmental control system according to an embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Broadly, the present invention can be integrated into environments such as spacecraft used in long-duration missions, specifically, space stations and spacecraft and habitats used in and beyond low earth orbit, as the invention, particularly gas-liquid separation, operates independent of gravity. Closed loop life support in a habitat on the surface of the Moon, Mars, asteroids, and moons is an option. Alternatively, the present invention can be used to recover and concentrate carbon dioxide from the atmosphere, for example, including those of Earth and Mars. The present invention may also be used for aircraft or submarines, as examples, where its gravity independence would help mitigate failures due to managing liquids under turbulence or placing the vehicle in an inverted position.

The present invention may be part of an environmental control system. The present invention can provide a contaminant (e.g., $CO_2$) removal subsystem that may interface with an upstream temperature and humidity control device which interfaces with an environment for occupants, such as a cabin. Downstream of this removal subsystem, water may be stored for water processing, whereas a contaminant outlet may interface with a contaminant reduction subsystem. It will be understood by those skilled in the art that incorporation of a contaminant removal subsystem into an integrated environmental control system will be desirable in some applications, including aircraft cabins, but for other applications, the subsystem may be operated as an independent unit, or integrated with other subsystems which convert carbon dioxide into oxygen and other byproducts.

Air that will be processed using the system described in this patent may come from occupied environments, and may contain substantial humidity. It is an important object of this invention that it removes carbon dioxide from air containing humidity and produces a carbon dioxide product stream that is substantially free of contaminating water. In the event that the process is intended to provide carbon dioxide to a downstream Sabatier reactor, this reactor can tolerate a water concentration in the carbon dioxide no greater than 2%. It is therefore an object of the invention to provide carbon dioxide that meets this purity requirement.

This invention generally provides a metabolic $CO_2$ removal system for spacecraft which can include a continuous, liquid-based architecture having scrubbing and stripping hollow fiber membrane gas-liquid contactors between which an ionic liquid absorbent is pumped. The high surface area of the hollow fiber membrane contactors enables a high mass transfer of $CO_2$, humidity, and contaminant gases into the ionic liquid using a small system volume and weight. The membrane contactor can ensure that liquid and gas do not need further separation, enabling the device to act in a gravity-independent way without the use of moving parts.

This invention can flow the liquid absorbent counter-current through hollow-fiber membranes to achieve the required mass transfer without the need of a powered spray system and coalescer. It can also allow contact between the liquid absorbent and gaseous contaminants, without the mixing of the liquid and air, which in other contactors would result in the need for centrifugal separator machinery to separate the phases. Not mixing the air and liquid can also decrease the risk of contamination of absorbent into the cabin.

The same membrane-based device can be used as a stripper component to eliminate the need for a spray scrubber contactor. Whereas a spray stripper might experience ionic liquid buildup due to the lack of gravity and lack of large movement of fluid through the chamber, a membrane contactor stripper can allow for easy fluid flow without the need to generate centrifugal forces.

In an exemplary embodiment, the invention is in a regenerable cabin air CO2 and water control system of a full regenerable air-revitalization system for spacecraft and distant habitats with long duration missions. Upstream of the CO2 removal device in this regenerable air revitalization system might be a temperature and humidity control device. Downstream of the CO2 removal device might be a device which processes the captured CO2 into water (and methane as a byproduct), or converts it directly into oxygen (and carbon, carbon monoxide, and/or methane as a byproduct).

A membrane contactor could comprise a cylindrical module filled with parallel hollow porous fibers. Dimensions of these hollow fibers could be <3 mm, and the pore dimension could be <2 microns. Optionally, baffles or other structures may also be present between the fibers or between the fibers and the outer shell to improve mixing of the fluid on the shell side. Also optionally, flow on the shell side may be swirled or turbulated using duct bends prior to entry into the membrane module and/or angling flow entry vector into the module and/or using guide vanes or similar structures to enhance mass transfer across the membrane. Ports on the two ends of the modules may connect to a manifold (typically called a tube sheet) allowing fluid flow from the ports through the bore of each fiber and hence to the opposing port. Two additional ports may access the shell-side at opposite ends of the module, allowing fluid flow on the outside of the fibers through the module. The material of the hollow fibers can be selected such that the ionic liquid does not wet the pores, and the trans-membrane pressure is kept low enough to prevent pore penetration. Possible choices for the fiber material include hydrophobic materials such as polypropylene, polyvinylidene fluoride, polysulf one, polyimide and polytetrafluoroethylene. Optionally, a coating can be applied of PTFE, polyimide, or a crosslinked siloxane, to prevent liquid flow through the pores. The ionic liquid flow can be either on the "tube" side or the "shell" side. Gas is flowed on the other side.

In operation as a scrubber, clean ionic liquid could be flowed on one side of the membrane, and air containing $CO_2$ on the opposite side. Since the membrane is hydrophobic, vapor, including $CO_2$ and water, could be allowed to cross the membrane fibers and be absorbed by the ionic liquid, and carried away to a reservoir, while the ionic liquid cannot pass through the membrane fibers, and is thus contained from the airstream.

In operation as a stripper, loaded ionic liquid could be flowed on one side of the membrane, and a small flow of sweep gas on the opposite side. The temperature of the liquid could be raised and the partial pressure of $CO_2$ and/or water on the gas phase side could be decreased to create a driving force for $CO_2$ and/or water to transfer. One way to accomplish this would be to apply a vacuum on the gas side. The stripper may also take advantage of any differences in desorption temperature or pressure between $CO_2$ and/or water to separate the two constituents.

In an exemplary embodiment of the present invention, use of a liquid absorbent and a continuous processing architecture allows for the efficient collection of both $CO_2$ and humidity in a single scrubber stage, and the efficient desorption of $CO_2$ and humidity in separate stripper stages. In an embodiment of this dual stripper system, a $CO_2$ stripper could be located downstream of the $CO_2$ and humidity scrubber.

According to the present invention, the $CO_2$ stripper could use a pure water sweep gas, created by vaporizing liquid water, in order to assist with $CO_2$ stripping. This pure water sweep gas can allow for a higher $CO_2$ partial pressure ratio between the gas and liquid phase in comparison to using a $CO_2$-water sweep gas, making $CO_2$ stripping and $CO_2$-water separation more efficient. Although $CO_2$ stripping occurs in this stripper, water stripping may not occur in this stripper. Scrubbing or stripping of the water may occur, but ideally, the water in the ionic liquid will be in equilibrium with the water vapor provided by the sweep gas. If absorption of some of the sweep gas were to occur, less sweep gas would be available to provide efficient $CO_2$ stripping. Water stripping can occur, in an embodiment, in a downstream water stripper, in which dry processed air from the scrubber is used as a sweep gas to strip water from the absorbent. Liquid water can then be collected using a compressor and condenser for each of two strippers.

This dual stripper architecture of the present invention can allow for more efficient desorption of $CO_2$ and humidity from the sorbent, and thus allows the total size of the $CO_2$ and humidity removal system to be much smaller than prior systems. In addition to size and weight, this liquid architecture can eliminate the dusting and contamination problems experienced by prior $CO_2$ removal systems, and can decrease the power and heat rejection required by the system.

US patent application entitled "Apparatus and Methods for Enhancing Gas-Liquid Contact/Separation" filed Feb. 1, 2017, Ser. No. 15/422,170; US patent application entitled "Ionic Liquid $CO_2$ Scrubber for Spacecraft" filed Feb. 1, 2017, Ser. No. 15/422,166; and US patent application entitled "Hollow Fiber Membrane Contactor Scrubber/Stripper For Cabin Carbon Dioxide and Humidity Control" filed concurrently herewith are incorporated herein by reference as though fully set forth herein.

Herein, the term "absorbent" is intended to generally include absorbents and/or adsorbents.

FIG. 1 is a schematic diagram of an exemplary embodiment of an environmental control system (ECS) 100 according to the present invention. The ECS 100 may receive an outside air 101 which, for example, may be a bleed air when the ECS 100 is implemented for an aircraft. The outside air 101 may flow to one or more sensors 102 that may sense characteristics of the outside air 101, such as temperature and/or humidity.

From the one or more sensors 102, the outside air 101 may flow to one or more sensors 115 that may sense characteristics of the air 101 such as temperature, pressure and/or humidity. Once past the sensor(s) 115, the outside air 101 may be conditioned by an air conditioning subsystem 103, which conditioning may include temperature, pressure and/or humidity.

Conditioned air may flow from the air conditioning subsystem 103, through a mix manifold 104, and into an environment 105 to be conditioned. The environment 105 may be an enclosed area for occupants, such as a cabin of an aircraft. In the environment 105, the conditioned air may acquire contaminants, such as from occupants in the environment 105, and produce a contaminated air.

Upon exiting the environment 105, the contaminated air may be sensed by one or more gas contaminant sensors 106. The sensor(s) 106 may sense one or more gas contaminants, such as $CO_2$. Once past the sensor(s) 106, the contaminated air may be filtered by a filter 108. A part of filtered air from the filter 108 may then be sensed by one or more VOC sensor(s) 107 that may sense one or more volatile organic compounds (VOCs). After the sensor(s) 107, the part of a filtered air from the filter 108 may move into a recirculation fan 110. From the recirculation fan 110, the filtered air may be forced into the mix manifold 104 where the filtered air can be mixed with the conditioned air from the air conditioning subsystem 103.

Instead of and/or in addition to the filtered air moving through the fan 110, a part of filtered air from the filter 108 may move through a contaminant removal subsystem 111. The removal subsystem 111 may remove one or more gas contaminants sensed by the one or more sensors 106. The contaminant removal subsystem 111 may, in various embodiments, include one or more gas-liquid contactor and separators, such as those described below, to effectuate removal of gas contaminants. However, the present invention envisions that gas-liquid contactor and separators, other than those described below, can be employed.

Within the contaminant removal subsystem 111, a used liquid absorbent may be produced. "Used liquid absorbent" means "clean liquid absorbent" that has absorbed gas contaminant(s). "Clean liquid absorbent" or "cleaned liquid adsorbent" means liquid absorbent that is substantially free of absorbed gas contaminant(s).

Also within the contaminant removal subsystem 111, a regenerated liquid absorbent may be produced. "Regenerated liquid absorbent" means used liquid absorbent that has undergone desorption of gas contaminant(s).

Additionally within the contaminant removal subsystem 111, a cleaned air may be produced. "Cleaned air" means air that has an insubstantial amount of gas contaminant(s) and/or $H_2O$. In embodiments, "cleaned air" has a gas contaminant(s) and/or $H_2O$ concentration less than that of the outside air 101 and/or less than that of the contaminated air from the environment 105.

Cleaned air from the subsystem 111 may flow into a photocatalytic oxidizer (PCO) 112 to remove one or more VOCs and thereby produce a further cleaned air. One or more VOC sensors 113 may be downstream of the PCO 112. One or more gas contaminant sensors 109, such as $CO_2$ sensor(s), can be downstream of the VOC sensor(s) 113. The further cleaned air flow can then flow into the fan 110, and then into a mix manifold 104 where it can be mixed with conditioned air from the air conditioning subsystem 103.

Instead of and/or in addition to flowing through the PCO 112, a part of cleaned air (e.g., <10%) from the contaminant removal subsystem 111 may recirculate back into the subsystem 111 for additional processing such as desorption of gas contaminant(s) from used liquid absorbent, and regeneration of clean liquid absorbent, as further described below.

A controller 114 may be in communication with one or more of the sensors 106, 109, 113, 115 for control over one or more components of the ECS 100, such as fan(s) and/or and valve(s) (not all of which may be shown in FIG. 1).

Figure 2:
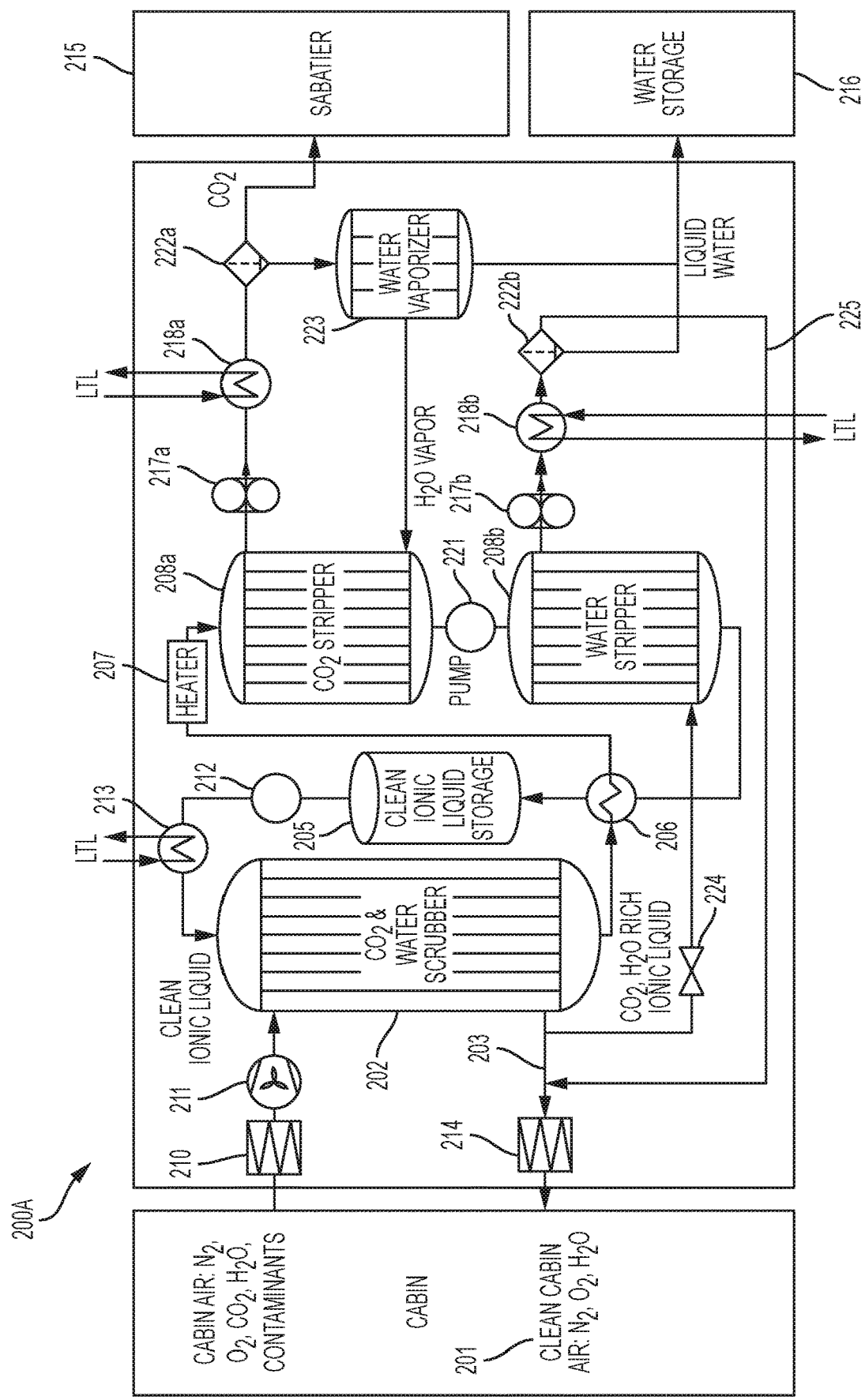
FIG. 2 is a schematic diagram of a contaminant removal subsystem according to an embodiment of the present invention.

FIG. 2 is a schematic diagram of an exemplary contaminant removal subsystem (i.e., closed-loop air revitalization subsystem) 200A that may be employed in the aircraft ECS 100 above and/or in a space-based system. However, other contaminant removal subsystems may be employed. A "closed-loop air revitalization subsystem" is intended to mean a subsystem which recovers valuable resources from waste products, such as recovering valuable oxygen from waste carbon dioxide. The subsystem 200A may include one or more gas-liquid contactor-separators to effectuate removal of gas contaminant(s), such as those described below. However, the subsystem 200A is not limited to the contactor-separators described below.

The contaminant removal subsystem 200 may receive a contaminated air 201 from an environment, such as a spacecraft cabin. The contaminated air 201 may include one or more gas contaminants such as $CO_2$, and/or $H_2O$, and the air 201 may flow into a first gas-liquid contactor-separator (i.e., scrubber) 202. In embodiments, the contaminated air 201 may, before entering the scrubber 202, be filtered for dust and particulates, via a filter 210, as well as being forced, via a fan 211, into the scrubber 202.

Concurrent with, or sequentially with, the scrubber 202 receiving the contaminated air 201, a clean liquid absorbent may be pumped, via a pump 212, into the scrubber 202, from a clean liquid absorbent storage 205. In embodiments, the liquid absorbent may be one or more ionic liquids described below.

Before entering the scrubber 202, the clean liquid absorbent may be cooled by a cooler 213 disposed between the pump 212 and the scrubber 202.

From the scrubber-separator 202, cleaned air 203 may optionally flow through a filter 214, to capture any leaked ionic liquid and/or produce a further cleaned air that can flow back to the environment to be conditioned. In embodiments, the cleaned air 203 may have a gas contaminant(s) concentration, and/or $H_2O$ concentration, lower than that of the contaminated air.

Also, from the scrubber-separator 202, used liquid absorbent may exit. The used liquid absorbent may flow into a heat exchanger 206. Therein, the used liquid absorbent may be heated by a regenerated liquid absorbent described below, and next flow into a heater 207 wherein the used liquid absorbent may be further heated. Alternatively, in the context of an aircraft, the used liquid absorbent may be heated by trim air.

From the heater 207, a heated, used liquid absorbent (i.e., absorbent liquid with contaminants) may be received by a second gas-liquid contactor-separator (i.e., stripper) 208a. In embodiments, the stripper 208a may be configured to primarily strip $CO_2$ from the used liquid absorbent, as compared to $H_2O$ therein.

A sweep gas, in the form of water vapor from a water vaporizer 223 described below, may be used to discharge $CO_2$ from the stripper 208a. In embodiments, the stripper 208a may have the same design as the scrubber 202, or a different design. In the context of an aircraft, the stripper 208a may also be used to discharge (i.e., not recirculate) primarily carbon dioxide (as opposed to $H_2O$) which can be transferred to the trim air.

From the stripper 208a, discharged contaminants, such as primarily $CO_2$, may be pumped, via a pump 217a, through a condenser 218a, and then a water separator 222a. From the water separator 222a, $CO_2$ may flow into a Sabatier reactor 215 for recovery of the oxygen value from the $CO_2$. Other reactor possibilities include solid oxide electrolyzer, which makes $CO+O_2$ (valuable if the $CO_2$ came from the Mars atmosphere). Other reactors might make $CH_4$ and/or carbon and/or $O_2$.

Also from the water separator 222a, liquid water may flow into a water vaporizer 223, from which water vapor can be discharged for use as the sweep gas in the stripper 208a. Liquid water, discharged from the water vaporizer 223 may flow to a water storage 216 for recovery and reuse. The invention is using water recovered from the process as the sweep gas, and this is a key advantage of the process since it avoids use of a stream that does not originate from the process. For space applications, where we need to bring whatever we need with us, this is a big advantage.

The stripper 208a, while discharging contaminants such as $CO_2$, may also be discharging a partially regenerated or partially cleaned liquid absorbent. Because water was used as a sweep gas, the concentration of water at the outlet of the first stripper 208a may be higher than at the inlet. In embodiments, a gas contaminant concentration in the partially regenerated liquid absorbent is lower than that of the used liquid absorbent. The partially regenerated liquid absorbent may be pumped, via a pump 221, into a third gas-liquid contactor-separator 208b.

In embodiments, the stripper 208b may be configured to primarily strip water from the partially regenerated liquid absorbent, as compared to $CO_2$. A sweep gas, in the form of cleaned air 203, via a needle valve 224, from the scrubber 202, may be used to discharge water from the stripper 208b. In embodiments, the stripper 208b may have the same design as the scrubber 202 and/or scrubber 208a, or a different design. In the context of an aircraft, the stripper 208b may also be used to discharge (i.e., not recirculate) water which can be transferred to the trim air.

Concurrent with the stripper 208b discharging or outflowing contaminants, such as water, the stripper 208b may also be discharging or outflowing fully regenerated or fully cleaned liquid absorbent to the clean liquid absorbent storage 205.

A vacuum pump and/or compressor 217b may pump the discharged contaminant(s), such as water, from the stripper 208b into a condenser 218b, and then into a water separator 222b. Therefore, in embodiments, the water separator 222b may discharge liquid water into the water storage 216 for recovery and reuse. Also from the water separator 222b, a clean air 225 may exit and flow into the filter 214 before entering the environment to be conditioned. By adjusting the sweep gas flow rate passing valve 224, the pressure applied by the pump 217b and the temperature of the condenser 218b, varying amounts of water may be removed from the sweep gas. In some embodiments, it may be desirable to remove less water from the air, and deliver a more humid product stream back to the cabin, improving comfort for the crew. Alternatively, more water may be removed for delivery to the water storage tank.

As can be seen, in embodiments, contaminants such as CO2 and/or H2O may be recovered and reused, such as by the Sabatier reactor 215 and by the water storage 216, respectively. A Sabatier reactor functions by reacting the carbon dioxide with hydrogen to convert it to methane and water. The water, in turn, may be electrolyzed to generate hydrogen and oxygen, forming a closed-loop air revitalization system.

Figure 3:
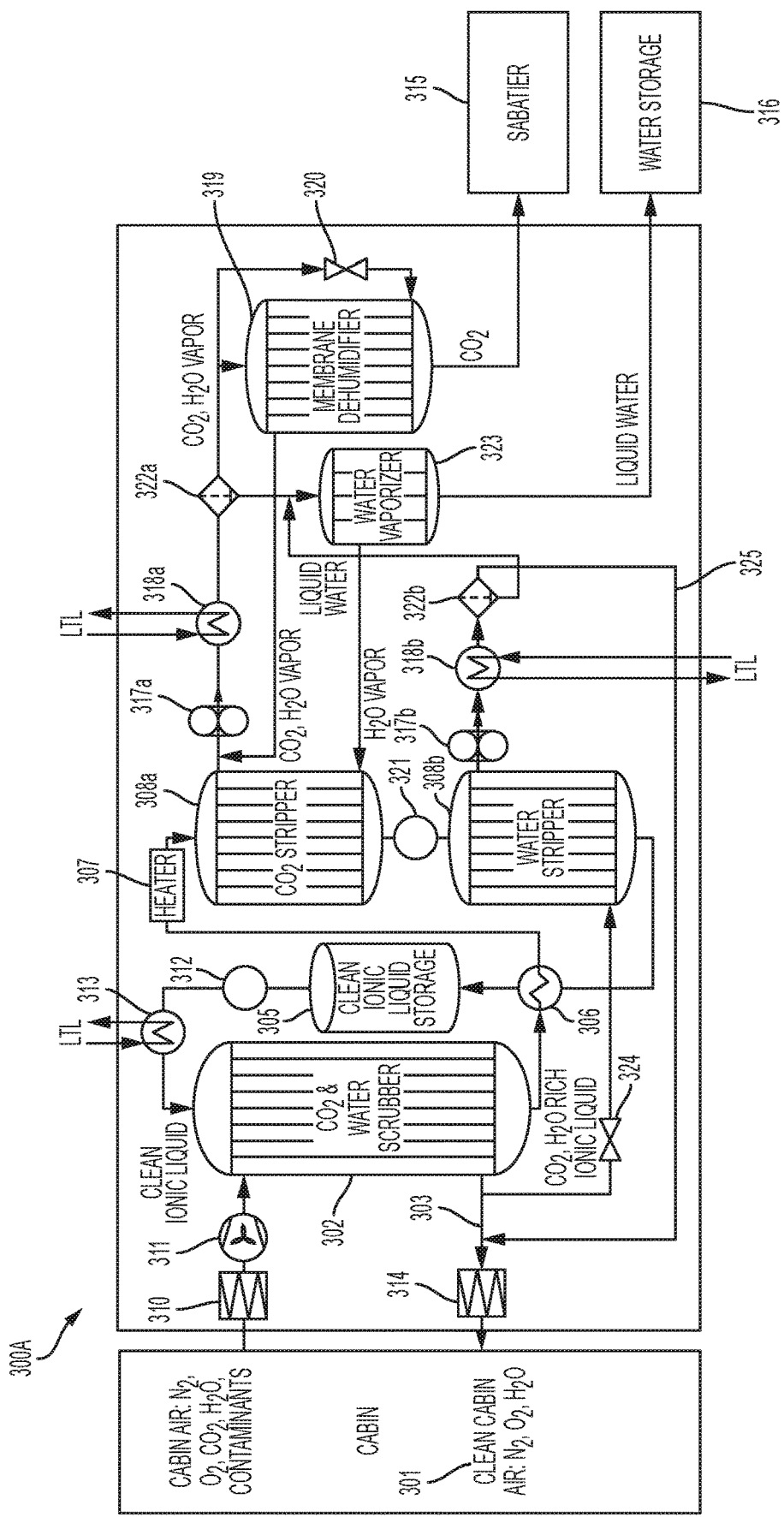
FIG. 3 is a schematic diagram of a contaminant removal subsystem according to another embodiment of the present invention.

FIG. 3 is a schematic diagram of another exemplary contaminant removal subsystem (i.e., closed-loop air revitalization subsystem) 300A that is similar to the subsystem 200A shown in FIG. 2. Accordingly, reference numbers in FIG. 3 correspond to like reference numbers in FIG. 2.

However, in the embodiment of FIG. 3, among other things, a dehumidifier 319 is provided. More specifically, and unlike the embodiment of FIG. 2, in the embodiment of FIG. 3, the dehumidifier 319 is downstream of the second gas-liquid contactor-separator (i.e., stripper) 308a.

Accordingly, from the stripper 308a, the water separator 322a can outflow contaminants, such as CO2 and/or H2O vapor, directly into the membrane dehumidifier 319, connected to one side of the membrane, and/or indirectly into the dehumidifier 319 via a needle valve 320, connected to the opposite side of the membrane. The dehumidifier 319, upon receiving, via the needle valve 320, a mixture of CO2 and/or H2O vapor, may use such mixture therein as a sweep gas. This sweep gas may have a lower pressure than the gas on the opposite side of the membrane because of the pressure drop across the valve 320, and because of the fluid connection with the suction side of the compressor 317a. The dehumidifier 319 may separate CO2 from H2O vapor coming directly from the water separator 322a and discharge primarily CO2 to a Sabatier reactor 315 for recovery and reuse.

Upon the sweep gas mixture of CO2 and/or H2O exiting the dehumidifier 319, the sweep gas mixture may recirculate back to a point upstream of (i.e., at the suction side of) the compressor 317a.

Figure 4:
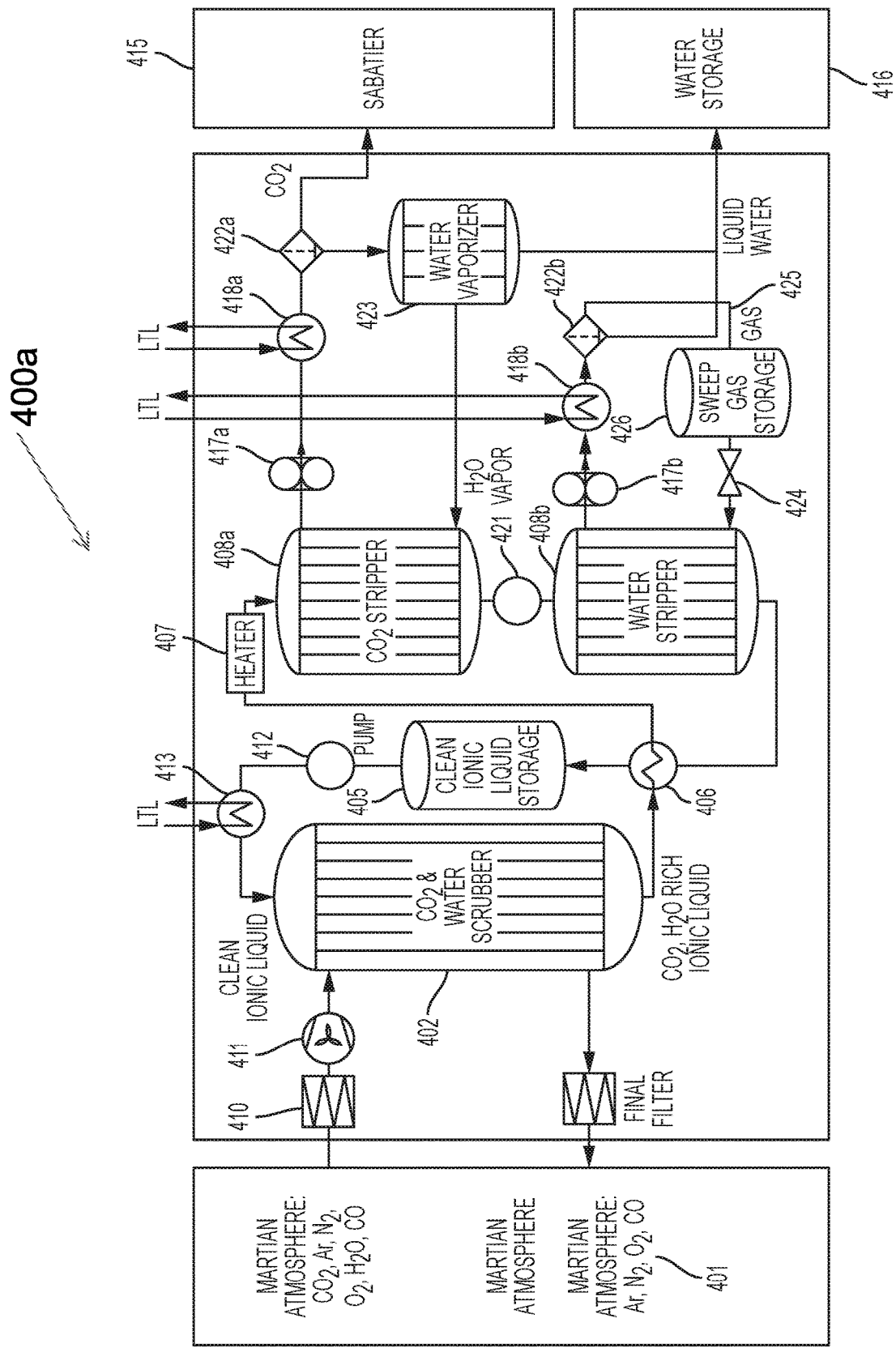
FIG. 4 is a schematic diagram of a contaminant removal subsystem according to yet a further embodiment of the present invention.

FIG. 4 is a schematic diagram of yet another exemplary contaminant removal subsystem (i.e., closed-loop air revitalization subsystem) 400A that is similar to the subsystem 200A shown in FIG. 2. Accordingly, reference numbers in FIG. 4 correspond to like reference numbers in FIG. 2.

However, in the embodiment of FIG. 4, among other things, a sweep gas 425, in the form of air from a water separator 422b, via a sweep gas storage 426 and a needle valve 424, to a water stripper 408b is provided. This is contrast to the embodiment of FIG. 2 wherein a sweep gas to the water stripper 208b is provided in the form of clean air 203 from the water scrubber 202.

FIGS. 5A-5B depict an exemplary embodiment of a scrubber 502 that may be employed in the contaminant removal subsystem 200, for example. As a further example, the scrubber 502 may be employed as the scrubber 202 and/or 302. In FIG. 5A, the scrubber 502 may include a cylindrical housing 502a that encloses a hollow fiber bundle 502b. Contaminated air may enter the housing 502a at one end thereof and cleaned air may exit at an opposite end thereof. Regenerated or clean absorbent liquid may enter the housing 502a at one side thereof, and used liquid absorbent with contaminants may exit the housing 502a at an opposite side thereof. In this embodiment, regenerated or clean absorbent liquid flows counter (i.e., opposite) to the contaminated air flow. Moreover, the counter flow causes contaminants to flow radially outward from the hollow fiber bundle 502b.

FIG. 5B depicts the same flows as in FIG. 5A, but in the context of a single hollow fiber 502c that can be part of the hollow fiber bundle 502b.

Figure 6B:
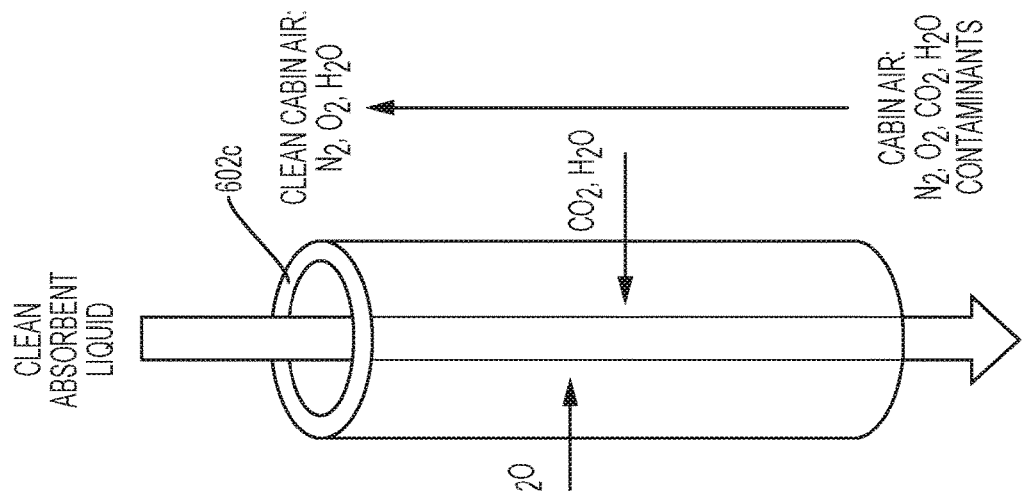
FIGS. 6A-6B are side views of a scrubber according to another embodiment of the present invention.
Figure 6A:
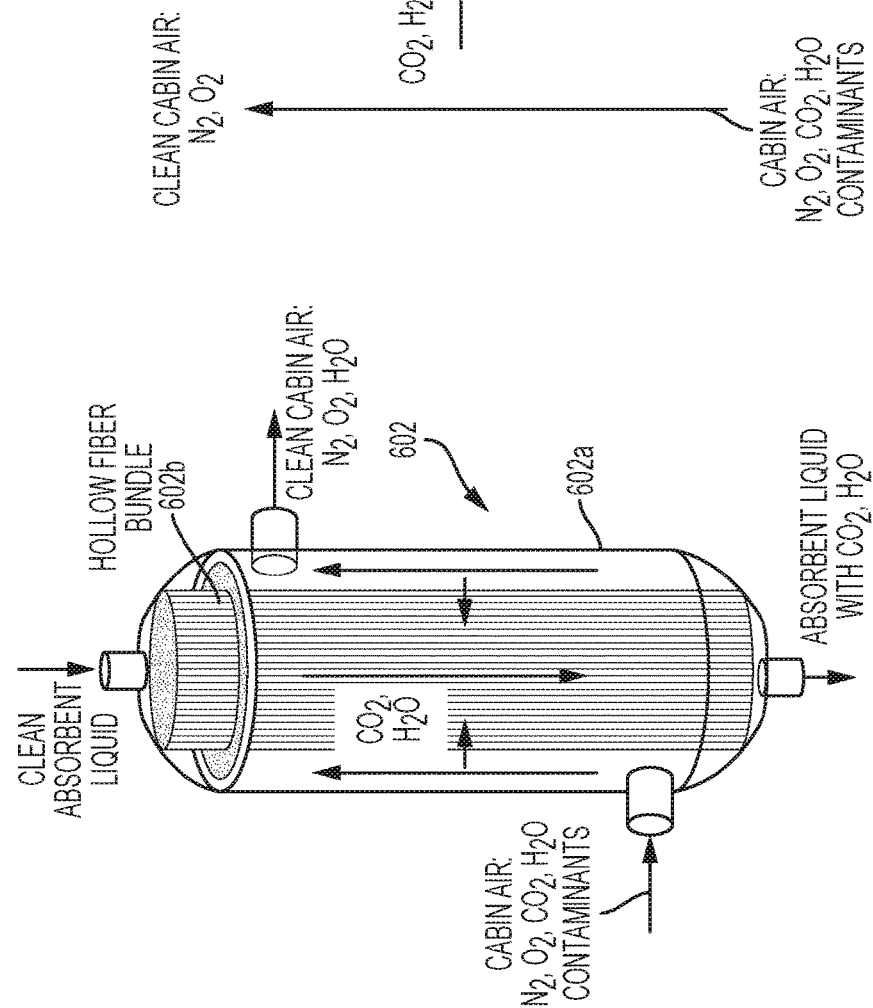

FIGS. 6A-6B depict another exemplary embodiment of a scrubber 602 that may be employed in the contaminant removal subsystem 200, for example. As a further example, the scrubber 602 may be employed as the scrubber 202 and/or 302. As in FIG. 5A, in FIG. 6A, the scrubber 602 may include a cylindrical housing 602a that encloses a hollow fiber bundle 602b. However, contaminated air may enter the housing 602a at one side thereof and clean air may exit at an opposite side thereof. Regenerated or clean absorbent liquid may enter the housing 602a at one end thereof, and used absorbent liquid with contaminants may exit the housing 602a at an opposite end thereof. As in FIG. 5A, in this embodiment, clean absorbent liquid flows counter (i.e., opposite) to the contaminated air flow. However, the counter flow causes contaminants to flow radially inward towards the hollow fiber bundle 602b.

FIG. 6B depicts the same flows as in FIG. 6A, but in the context of a single hollow fiber 602c that can be part of the hollow fiber bundle 602b.

Figure 7B:
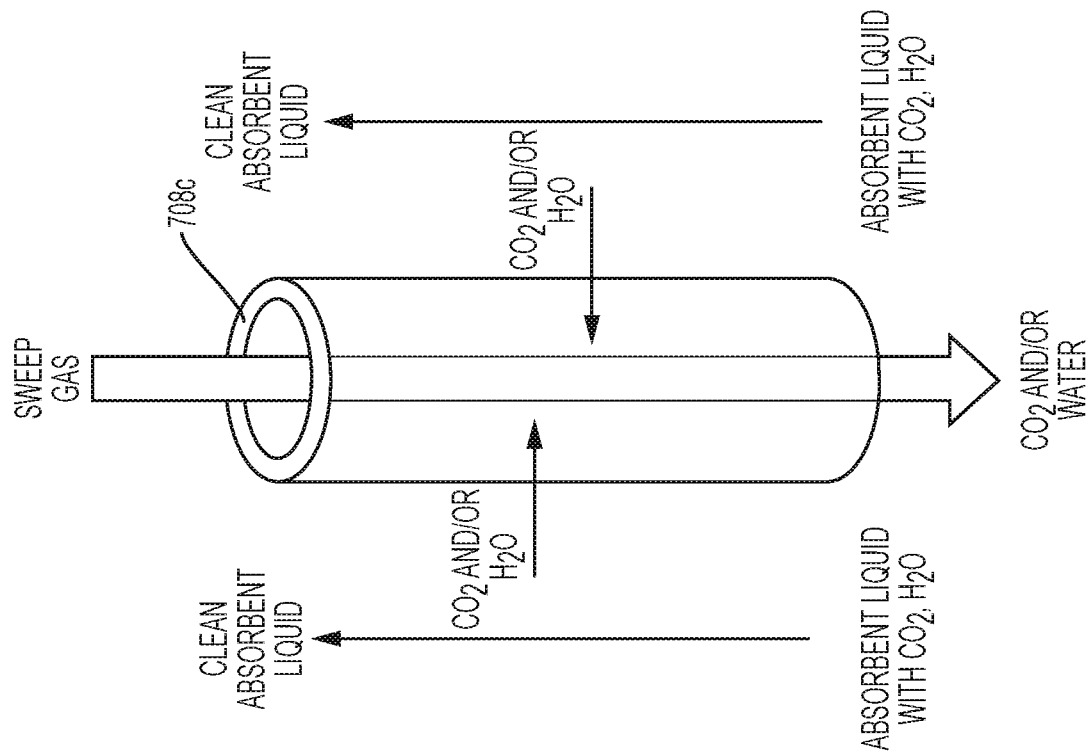
FIGS. 7A-7B are side views of a stripper according to an embodiment of the present invention.
Figure 7A:
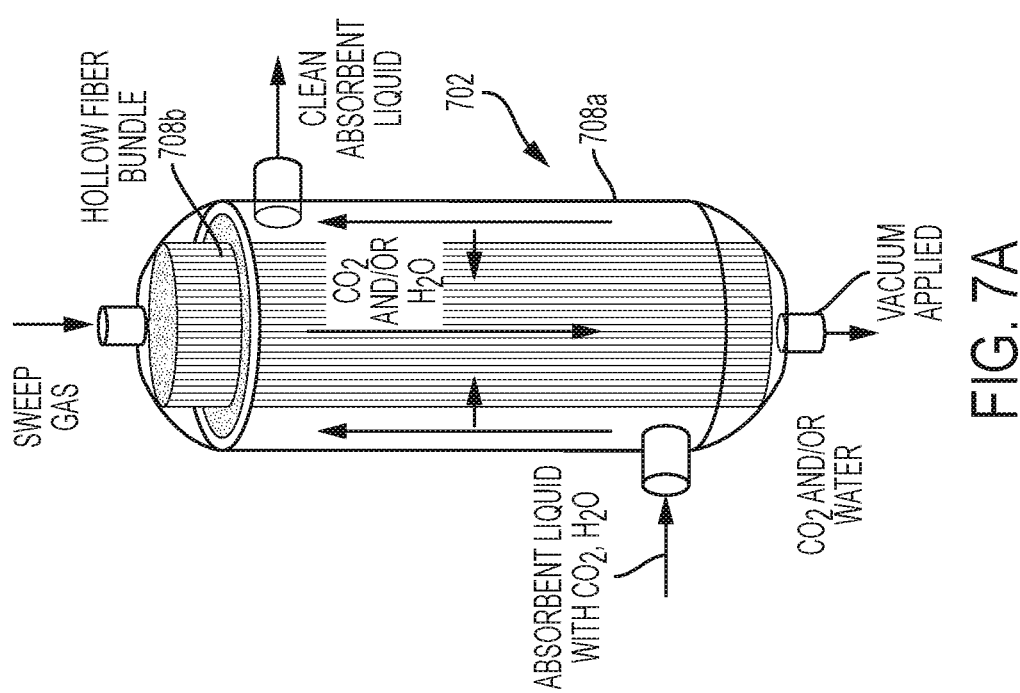

FIGS. 7A-7B depict an exemplary embodiment of a stripper 708 that may be employed in the contaminant removal subsystem 200, for example. As a further example, the stripper 708 may be employed as the stripper 208a, 208b, 308a, and/or 308b. In FIG. 7A, the stripper 708 may include a cylindrical housing 702a that encloses a hollow fiber bundle 702b. Sweep gas may enter the housing 702a at one end thereof and contaminants may exit at an opposite end thereof. Used absorbent liquid with contaminants may enter the housing 702a at one side thereof, and regenerated or clean absorbent liquid may exit the housing 702a at an opposite side thereof. In this embodiment, used absorbent liquid with contaminants flows counter (i.e., opposite) to the sweep gas flow. Moreover, the counter flow causes contaminants to flow radially inward towards the hollow fiber bundle 702b.

FIG. 7B depicts the same flows as in FIG. 7A, but in the context of a single hollow fiber 702c that can be part of the hollow fiber bundle 702b.

FIGS. 8A-8B depict another exemplary embodiment of a stripper 808 that may be employed in the contaminant removal subsystem 200, for example. As a further example, the stripper 808 may be employed as the stripper 208a, 208b, 308a, and/or 308b. As in FIG. 7A, in FIG. 8A, the stripper 808 may include a cylindrical housing 802a that encloses a hollow fiber bundle 802b. However, sweep gas may enter the housing 802a at one side thereof and contaminants may exit at an opposite side thereof. Used absorbent liquid with contaminants may enter the housing 802a at one end thereof, and regenerated or clean absorbent liquid may exit the housing 802a at an opposite end thereof. As in FIG. 7A, in this embodiment, sweep gas flows counter (i.e., opposite) to the used absorbent liquid with contaminants flow. However, the counter flow causes contaminants to flow radially outward from the hollow fiber bundle 802b.

FIG. 8B depicts the same flows as in FIG. 8A, but in the context of a single hollow fiber 802c that can be part of the hollow fiber bundle 802b.

Figure 9:
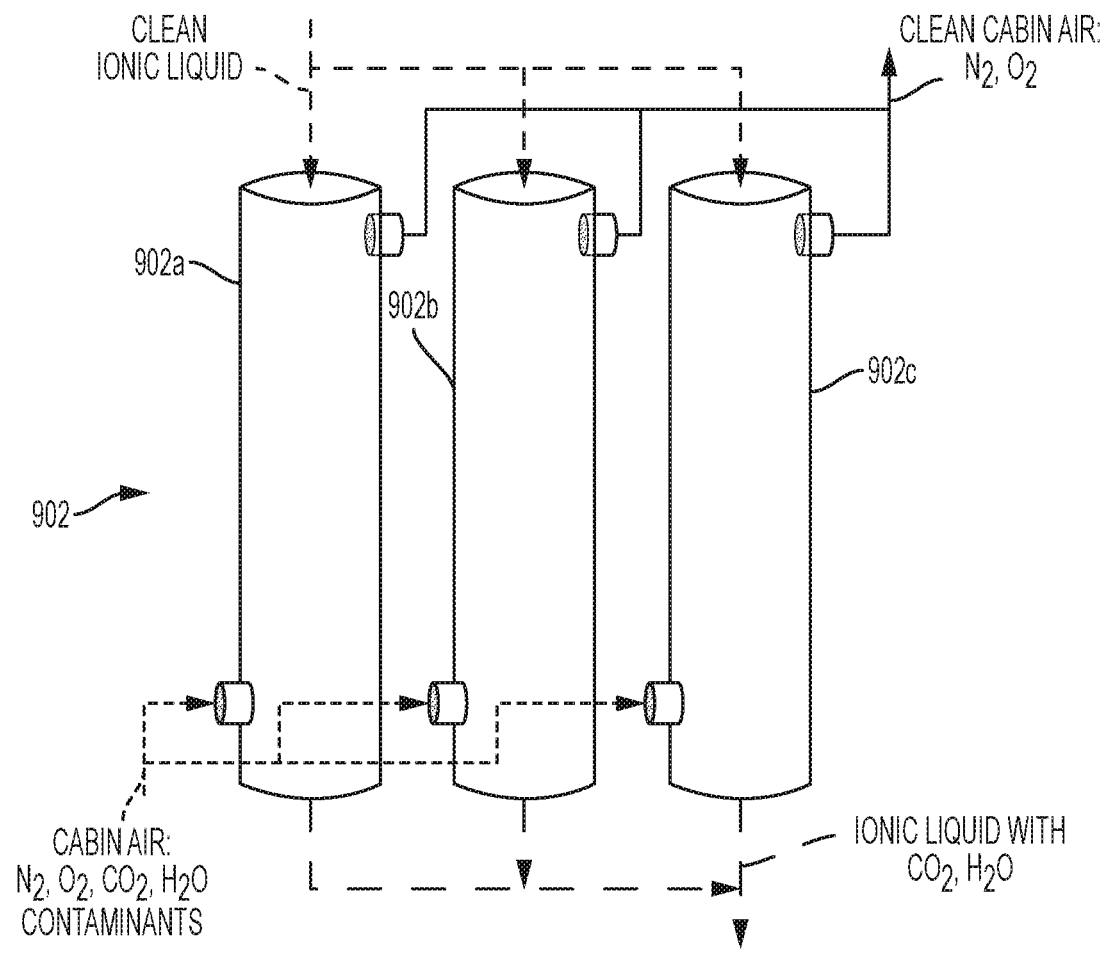
FIG. 9 is a schematic view of a scrubber according to a further embodiment of the present invention.

FIG. 9 depicts yet another exemplary embodiment of a scrubber 902 that may be employed in the contaminant removal subsystem 200, for example. As a further example, the scrubber 902 may be employed as the scrubber 202 and/or 302. In FIG. 9, the scrubber 902 may include a plurality of parallel housings 902a, b, c that enclose respective hollow fiber bundles (not shown) that can be similar to those in FIGS. 5A-5B or FIGS. 6A-6B. The foregoing may be employed for a stripper.

Although FIGS. 5-9 describe a hollow fiber and/or bundle in the context of a stripper and/or scrubber, it should be understood that the same may be employed in the context of a dehumidifier, such as that described in C. Iacomini, J. Hecht, J. Harrell, J. Lumpkin "Qualification of the Boeing Starliner Humidity Control Subassembly", 46th International Conference on Environmental Systems, 10-14 Jul. 2016, Vienna, Austria, ICES-2016-322, which is incorporated herein by reference.

According to the present invention, the liquid absorbent can meet a demanding set of criteria. The liquid can be safe and nontoxic to humans, and may not contaminate the purified air with odors or organic vapors. It may absorb carbon dioxide at the partial pressure expected during the mission, and may not lose performance when simultaneously absorbing water. It may also be regenerable without the use of space vacuum, so as not to lose CO2 and water to space, and regenerable without using excessive temperatures or power. The liquid may be durable and last without deterioration for the life of the mission.

The liquid absorbent can be one or more ionic liquids. They are salts, generally comprised of an anion and organic cation, which are liquid at their temperature of use. Because they are salts, they have effectively zero vapor pressure, thus eliminating odors and reducing the likelihood of contaminating the purified air. They are generally nontoxic and have sufficient stability to resist deterioration. Ionic liquids generally contain relatively large organic cations (quaternary ammonium or phosphonium compounds) and any of a variety of anions, both of which can be tailored to obtain desired characteristics. Ionic liquids can both physically dissolve carbon dioxide and have specific chemical interactions with it. As a class, almost every ionic liquid is water soluble and hygroscopic, meaning that they will absorb moisture from the air, but due to their negligible volatility, the water can be removed by evaporation either by elevating the temperature or reducing the water partial pressure. Because a very large number of ionic liquids exist, and both the cation and the anion can be tailored to obtain desired characteristics, this class of compounds has flexibility as the liquid absorbent for a carbon dioxide removal system with ability to remove contaminants.

Ionic liquids suitable for use in this invention comprise those with melting points below 20° C., low vapor pressure, and with capacity for carbon dioxide, at 30 deg. C. and in the presence of 3.8 torr carbon dioxide partial pressure, of >0.3 wt %. Examples of such ionic liquids include 1-ethyl-3-methylimidazolium acetate, 1-ethyl-3-methylimidazolium trifluoracetate, 1-butyl-3-methylimidazolium acetate, tributylmethylphosphonium acetate, triethylmethylphosphonium acetate etc. These ionic liquids are hygroscopic and can absorb water as well and carbon dioxide. Therefore, the effective working fluid can, in many cases, comprise a mixture of the ionic liquids specified and water. It may, under some circumstances, be useful to add water to the ionic liquid before contacting with carbon dioxide. This can reduce the carbon dioxide capacity but also reduce the viscosity.

1-butyl-3-methylimidazolium acetate (BMIM Ac) has a high CO2 capacity and well understood physical properties. BMIM Ac satisfies the basic requirements for an absorbent in a manned vehicle. It is not a hazardous substance or mixture, and has no hazards not otherwise classified. The autoignition temperature is 435° C. The compound is a clear, somewhat viscous liquid, and can be handled readily. The surface tension is similar to that for a polar organic solvent, and the density is similar to that for water. The onset for thermal degradation sets the upper temperature limit for processing, and is comfortably higher than the temperature needed for desorption. The viscosity for this ionic liquid is higher than that of water, but can be reduced either by raising the temperature or the water content. In normal use, the ionic liquid absorbs both CO2 and water, and therefore the viscosity values vary in the presence of water. Viscosity plays a role in determining mass transfer rates for CO2 absorption and desorption. Control of viscosity can therefore reduce the weight and volume of the contactor-separator.

EXAMPLES

For mass transfer in membrane systems, we should consider transport in the gas phase, transport through the membrane, and liquid-phase mass transport. Gas-phase transport will be fast relative to the other processes, and it is possible to minimize the resistance to mass transfer through the membrane by proper material and morphology choices, leaving liquid phase mass transfer as the rate-determining process. To prevent the membrane from significantly slowing mass transfer, a non-wetting membrane material should be chosen, since liquid-filled pores create stagnant zones that inhibit liquid flow. For liquid-phase mass transfer, the mass transfer coefficient is expected to be strongly dependent on the diffusion coefficient, and this, in turn, depends primarily on the ionic liquid viscosity. The ratio between the mass transfer coefficient and the diffusion coefficient is determined by the Sherwood number. The Lévêque-Graetz and Kartohardjono approaches to estimating this number include dependencies on the velocity of flow through the fiber, liquid viscosity and the diffusion coefficient for CO2 in the liquid.

$$Sh = \sqrt[3]{3.67^3 + 1.62^3 \frac{vd^2}{DZ}}$$

-continued $$Sh = 0.1789 \varphi^{0.86} \left(\frac{\rho v d}{\eta}\right)^{0.34} \left(\frac{\eta}{\rho D}\right)^{\frac{1}{3}}$$

Avoiding wetting the membrane pores not only improves mass transfer but also prevents leakage of ionic liquid into gas lines. Such leakage would necessitate subsequent separation. The ability of the liquid to penetrate pores depends on the surface tension, the viscosity, the dimension of the pores and the contact angle. Because ionic liquids are polar and BMIM Ac has a surface tension of 36.4 mN m−1, these considerations guide us to investigate relatively hydrophobic membrane materials with low critical surface tensions, such as polytetrafluoroethylene (PTFE). We measured the contact angle for BMIM Ac on a porous PTFE surface to be 81.3, showing that it will not wet this material unless significant force is applied. Kreulen H, Kreulen, C. A. Smolders, G. F. Versteeg, W. P. M. van Swaaij "Microporous hollow fiber membrane modules as gas liquid contactors. Part 1. Physical mass transfer processes, A specific example: Mass transfer in highly viscous liquids" J. Membrane Sci., vol. 78, 1993, 197-216 and Z. Dai, L. Ansaloni, L. Deng "Precombustion CO2 capture in polymeric hollow fiber membrane contactors using ionic liquids: Porous membrane versus nonporous composite membrane" Ind. Eng. Chem., Res. Vol. 55, 2016, 5983-5992 each describe the addition of a composite layer to prevent pore-filling with very little effect on mass transfer.

Initial experimental results using a membrane contactor were obtained using a laboratory test stand. A hollow fiber microfiltration module was used for the contactor, with 90:10 BMIM Ac: water as the liquid phase, and air containing 1-4 torr partial pressure of CO2 at atmospheric pressure as the vapor phase. The pressures of both the liquid and the gas phases were controlled at up to 6 psig in operation. The ionic liquid may either be directed through the lumina of the hollow fibers or through the shell surrounding them, and we evaluated both options. When the ionic liquid passes through the lumina, the pressure drop is higher because of the viscosity of the ionic liquid, and there is less opportunity for bypass due to the small diameter of these fibers. In fact, we observed little difference between results from these two configurations. Equation (8) defines the mass transfer coefficient as the ratio of the molar flux to driving force (either concentration difference or partial pressure difference), and has been used to estimate the membrane area required for a CO2 load of 4.15 kg day-1, representing a likely load from four crew members in a deep space vessel.

$$k = \frac{n_{CO2}}{A \Delta c_{CO2}} = \frac{n_{CO2} RT}{A \Delta p_{CO2}}$$

CO2 diffusivity in the ionic liquid is expected to be a main parameter that defines the overall mass transfer and the process efficiency. The diffusivity of CO2 in air is very high in comparison with diffusion in the ionic liquid, so the main resistance to CO2 mass transfer is in the liquid phase. Addition of small amounts of water into the liquid decrease the viscosity and increase the diffusivity. We have shown that the water content in ionic liquid negatively affects the absorption capacity. However, the effect of water dilution on capacity is expected to be smaller than the positive effect of water dilution on liquid phase mass transfer rate via viscosity reduction, and by increasing the air-liquid surface area. In other words, the dilution of the ionic liquids with water that is inevitable because of the affinity of the ionic liquids for water is expected to increase the mass transfer rate (decrease scrubber size) without greatly decreasing the ionic liquid capacity (i.e. increasing the flow rate of ionic liquid).

Similarly, we have shown that this process relies on exposing a large surface area of ionic liquid to the air stream. In addition to mass transfer, heat transfer will also occur. Note that the ionic liquid entering the scrubber is cooled. This is beneficial because it increases the working CO2 loading capacity. Again, by taking advantage of this process, the load on cooling systems elsewhere in the spacecraft is reduced, resulting in weight and power reductions for these systems.

It is estimated that this system will be a low-maintenance, high-reliability system since the ionic liquid system will not have corrosion problems.

In addition to reducing the launch costs associated with the use of the ionic liquid system, the new system would also reduce the mass of consumables. The direct liquid contact system would not vent to space and would not have a connection to space vacuum. The use of the open-loop CO2 removal systems typically used in short-duration missions has also been considered for long-duration missions due to their simplicity and low size, weight and power. However, these devices would require an even greater launch cost due to consumables. Anderson, M. A., Ewert, M. K., Keener, J. F., Wagner, S. A., Stambaugh, I. C. NASA Report TP-2015-21870, Johnson Space Center, March, 2015 estimated that the use of an open-loop system would require a total of 21 kg/crewmember/day of potable water, oxygen, and the tanks to store them, or a total of about 75,600 kg for a 30 month mission to Mars with 4 crewmembers.

The combination of direct liquid contact and novel ionic liquids can provide an integrated carbon dioxide, humidity and trace contaminant removal system with a significantly lower size, weight and power compared to current systems. This system gains its advantage from the use of ionic liquid as the liquid absorbent. Liquid systems eliminate the mass transfer limitations and plumbing complexities of alternative solid adsorbents, and avoid contamination of the cabin air by the sorbent through the use of ionic liquids, which have zero vapor pressure. In addition to being containable, ionic liquids are flame retardant, non-toxic, and very stable. This sorbent is regenerable, without the use of space vacuum or high temperatures, and thus provides NASA with an excellent option for closed-loop CO2 removal on existing and future vehicles.

It should be understood, of course, that the foregoing relates to exemplary embodiments of the invention and that modifications may be made without departing from the spirit and scope of the invention as set forth in the following claims.

We claim:
1. An environmental control system, comprising:
an air conditioning subsystem;
a contaminant removal subsystem downstream of the environment to be conditioned; and
a mix manifold intermediate the air conditioning subsystem and the contaminant removal subsystem,
wherein the contaminant removal subsystem includes:
a first gas-liquid contactor-separator;
a second gas-liquid contactor-separator;
a third gas-liquid contactor-separator; and
wherein one of the first, the second, and the third gas-liquid contactor-separators is configured to:

receive used absorbent liquid having at least a first contaminant;

discharge at least a first contaminant for recovery and reuse;

wherein another of the first, the second and the third gas-liquid contactor-separators is configured to:

receive used absorbent liquid having at least a second contaminant;

discharge at least a second contaminant for recovery and reuse.

2. The contaminant removal subsystem of claim 1, further comprising a water vaporizer downstream of the second gas-liquid contactor separator.

3. The contaminant removal subsystem of claim 1, further comprising a water vaporizer downstream of the third gas-liquid contactor-separator.

4. The contaminant removal subsystem of claim 1, further comprising a dehumidifier downstream of the second gas-liquid contactor-separator.

5. The contaminant removal subsystem of claim 1, wherein the first, the second, and the third gas-liquid contactor-separators comprise a hollow fiber membrane bundle.

6. A contaminant removal subsystem, comprising:

a first gas-liquid contactor-separator;

a second gas-liquid contactor-separator downstream of the first gas-liquid contactor-separator; and a third gas-liquid contactor-separator downstream of the second gas-liquid contactor-separator;

wherein the first gas-liquid contactor-separator is configured to:

receive a clean absorbent liquid; and discharge a used absorbent liquid;

wherein the second gas-liquid contactor-separator is configured to:

receive the used absorbent liquid discharged from the first gas-liquid contactor-separator;

discharge a first contaminant, from the used liquid absorbent, for recovery and reuse; and discharge partially regenerated absorbent liquid;

wherein the third gas-liquid contactor-separator is configured to:

receive the partially regenerated absorbent liquid discharged from the second gas-liquid contactor-separator;

receive a sweep gas; and discharge a second contaminant, from the partially regenerated liquid absorbent, for recovery and reuse.

7. The subsystem of claim 6, further comprising a water vaporizer downstream of the second gas-liquid contactor-separator.

8. The subsystem of claim 6, further comprising a water vaporizer downstream of the third gas-liquid contactor-separator.

9. The subsystem of claim 6, further comprising a dehumidifier downstream of the second gas-liquid contactor-separator.

10. The subsystem of claim 6, wherein the first contaminant comprises carbon dioxide.

11. The subsystem of claim 6, wherein the second contaminant comprises water.

12. The subsystem of claim 6, wherein the second gas-liquid contactor-separator discharges the first and the second contaminants.

13. A contaminant removal subsystem, comprising:

a scrubber;

a first stripper downstream of the scrubber;

a second stripper downstream of the first stripper; and a water vaporizer downstream of the first stripper;

wherein the first stripper is configured to discharge a first contaminant for recovery and reuse;

wherein the second stripper is configured to discharge a second contaminant for recovery and reuse;

wherein the water vaporizer is configured to provide a sweep gas to the first stripper; and wherein the scrubber is configured to discharge a sweep gas to the second stripper.

14. The subsystem of claim 13, further comprising a dehumidifier downstream of the first stripper and configured to discharge the first contaminant for recovery and reuse.

15. The subsystem of claim 13, wherein the scrubber is configured to receive a clean liquid absorbent and discharge a used liquid absorbent to the first stripper.

16. The subsystem of claim 13, wherein the first contaminant comprises carbon dioxide.

17. The subsystem of claim 13, wherein the second contaminant comprises water.

* * * * *